United States Patent [19]

Perry, Jr. et al.

[11] 4,217,933
[45] Aug. 19, 1980

[54] DIVERTER VALVE FOR SEPTIC SYSTEMS

[76] Inventors: Carlos V. Perry, Jr.; Robert B. Mayer, both of 8012 Centreville Rd., Manassas, Va. 22110

[21] Appl. No.: 39,198

[22] Filed: May 15, 1979

[51] Int. Cl.³ .............................................. F16K 5/16
[52] U.S. Cl. ........................... 137/625.47; 137/367; 251/163; 251/312; 251/368
[58] Field of Search ........................... 137/625.47, 367; 251/162, 163, 312, 368

[56] References Cited

U.S. PATENT DOCUMENTS

| | | | |
|---|---|---|---|
| 3,536,101 | 10/1970 | Bosworth | 137/625.47 X |
| 3,572,383 | 3/1971 | Natalizia | 137/625.47 |
| 3,704,003 | 11/1972 | Harter | 251/312 |
| 4,036,249 | 7/1977 | Perry et al. | 137/371 X |

FOREIGN PATENT DOCUMENTS 1255424 11/1967 Fed. Rep. of Germany ...... 137/625.47

*Primary Examiner*—Arnold Rosenthal
*Attorney, Agent, or Firm*—John H. Merchant

[57] ABSTRACT

A diverter valve adapted for use in septic systems for controlling the flow of effluent from a septic tank to a plurality of leach beds, comprising a thick-walled injection molded valve body of PVC or ABS plastic, closed at the bottom and having a centrally disposed valve chamber provided with an inlet, and a plurality of outlet ports, rigid integrally formed ribs extending from the top to the bottom walls of the valve body dividing the same into separate inlet and outlet chambers communicating with the central valve chamber, a circular opening in the top of the valve body adapted to receive an injection molded tapered valve plug, a retainer cap for securing the valve plug and stem in operative position, the lower sides tapered and in contact with the valve body and the lower surface of the depending ring of the cap provided with a serrated surface to form a tight seal with the valve plug. The valve plug has a cut-away central portion providing a passageway for alternately connecting the inlet port with one of the outlet ports while closing the other outlet ports, the valve plug having an integral shaft extending beyond the top surface of the valve body and adapted to rest in sliding contact with valve seats formed in both the top and side walls of the valve body. The upper external circular portion of the valve body is provided with a series of steps to accommodate access means, such as a pipe, of differing internal diameters. The valve plug is so dimensioned as to leave a small amount of play between the bearing surfaces of the valve body, and means are provided so that when the valve plug cut-away central portion is aligned with the inlet port and an outlet port, the bearing surfaces of the valve plug and the valve body are pressed into close contact to form a relatively tight seal. This results in a sealed unit adapted for use in septic systems operating either at normal or positive pressures.

13 Claims, 11 Drawing Figures

DIVERTER VALVE FOR SEPTIC SYSTEMS

BACKGROUND OF THE INVENTION

This invention relates to an improved diverter valve of the type disclosed in the Perry et al U.S. Pat. No. 4,036,249, issued July 19, 1977, in which the valve body and associated parts are cast from urethane, a material admirably suited to withstand the severe conditions imposed upon equipment used in septic field installations.

Septic systems, used extensively to treat sewage in areas not served by public sewage systems, normally comprise a septic tank in which the raw sewage is collected and most of the solids separated from the liquid components. The solids are largely decomposed by anerobic bacteria within the tank, the residual solids settling to the bottom while the liquid effluent is discharged into a drain field and absorbed in the soil. The effluent, however, contains a certain amount of suspended solids and organic matter, and over a period of years, these materials tend to clog the drain field and materially reduce its efficiency. Thus, the most vulnerable segment of systems of this type is the drain field. In septic systems in which only a single leg or line of drain tile is employed, in time, the clogging action may reduce the efficiency of the field to such an extent as to require an extension of the original field or the installation of a new field.

During the past decade it has been demonstrated that if a drain field is permitted to "rest" at periodic intervals, its efficiency will be largely restored. It follows that if a drain field comprising at least two rather than a single leg or line of drain tile, by using a suitable valve arrangement, the legs or lines of the drain field may be used alternatively, permitting one leg to "rest" while the other leg is in operation.

The cast urethane valve described in the Perry et al patent, identified above, is particularly adapted to be used for this purpose in view of its rugged, simple construction and resistance to deterioration, thereby assuring continuous trouble-free operation with minimum maintenance expense.

The casting of a valve of the type disclosed in said patent, however, does involve a relatively expensive manfacturing operation and its design does not lend itself to a less expensive injection molding operation.

One of the objects of the present invention is to provide a diverter valve of novel design incorporating all of the advantages of the cast urethane valve, including resistance to all forms of deterioration, but one that may be injection molded from PVC or ABS plastic, at a considerable savings in manufacturing costs.

A further object of the present invention is to provide a sealed valve that may be used in septic tank systems operating under positive as well as normal pressures. The introduction of water under pressure in systems of this type has been found to enhance the distribution of effluent in the drain field, improves aerobic digestion, and results in a more rapid decomposition of the waste components of the effluent.

BRIEF DESCRIPTION OF THE INVENTION

The herein described diverter valve comprises a relatively heavy, thick walled, injection molded valve body, of PVC or ABS plastic, generally in the shape of a "Y", closed at the bottom and having a vertically disposed central circular chamber open at the top to receive a valve plug and stem, the valve body having a horizontally disposed circular inlet port and a plurality of outlet ports. The outside configuration of the valve body is a matter of individual choice and it may be round, oval, or angular, as desired.

The valve body is provided with a series of relatively heavy integral ribs extending upwardly from the bottom wall to the top wall of the valve body dividing the same into a plurality of substantially uniform chambers, communicating through the central chamber, with the inlet port and the outlet ports of the valve body.

The circular opening in the top of the valve body is adapted to receive a vertically mounted integral valve plug and stem, the interior walls of the valve body having at both the upper and bottom portions thereof, steps or ledges serving in cooperation with the leading edges of the internal inwardly extending ribs of the valve body, as bearing surfaces for the valve plug. The valve plug, which is tapered, comprises an injection molded unit having a circular top and a circular bottom section providing a sliding contact with the bearing surfaces of the valve body. The valve plug has a cutaway section defining a passageway for alternately connecting the inlet port with one of the outlet ports while closing the other outlet port or ports.

In order to insure that the valve plug will not jam when moved to connect the inlet port with one of the outlet ports in the valve body, the valve plug is in continuous resilient contact with the bearing surfaces of the valve body. However, the valve plug may be fitted loosely within its bearing surfaces, in which case, as the said plug approaches the end of its travel in either direction, means are provided for forcing or wedging the bearing surfaces of the plug into close contact with the opposing walls of the valve body to form a close seal therewith.

A molded cap is secured to the upper surface of the valve body by suitable fastening means, such as screws or bolts, to maintain the valve plug in operative position and seal the top of the valve body. The cap comprises an upper circular portion having a central opening through which the valve stem extends, and a depending circular tapered ring fitting within the upper interior walls of the valve body, the lower surfaces being formed with a series of resilient serrations, which under pressure are slightly deformed resulting in a liquid-tight seal.

The retainer cap is provided with semi-circular oppositely disposed grooves having stops therebetween adapted to receive extensions molded into the upper sections of the valve plug, said stops limiting the rotative movement of the valve plug and insuring proper alignment of the valve plug with the inlet port and one of the outlet ports in the valve body.

The under surface of the top circular section of the retainer cap is provided with a short projection, preferably having a rounded end, fitting into a corresponding depression in the upper surface of the valve body to assure proper alignment of these two parts during the assembly of the valve.

The valve plug is preferably formed in two sections which are subsequently joined or connected to form a integral unit. In such case the under surface of the top cap is provided with a small depression adapted to receive a corresponding projection molded into the upper surface of the circular top of the valve stem. This facilitates and assures the joining of the two sections in proper alignment.

Appropriate indicia are molded into or otherwise applied to the upper surface of the retainer cap so that, by inspection, it can be readily determined which one of the plurality of outlet openings are connected with the outlet opening of the valve body.

Diverter valves of the type herein described are normally installed several feet below ground level and means are provided for access to the valve stem as well as the valve body, such as a section of pipe, preferably of PVC or ABS plastic, of appropriate length, sealed at its upper end with a removable cap or plug. A stepped circular rib is molded into the upper surface of the valve body to receive an access pipe of varying internal diameters, the joint of which may be sealed with a suitable adhesive to exclude surface water.

The shaft of the valve plug which extends through the circular opening in the retainer cap terminates in an upwardly extending projection shaped to fit a slotted tool or "curb" key of sufficient length to operate the valve plug from ground level.

DETAILED DESCRIPTION OF THE INVENTION

Figure 1:
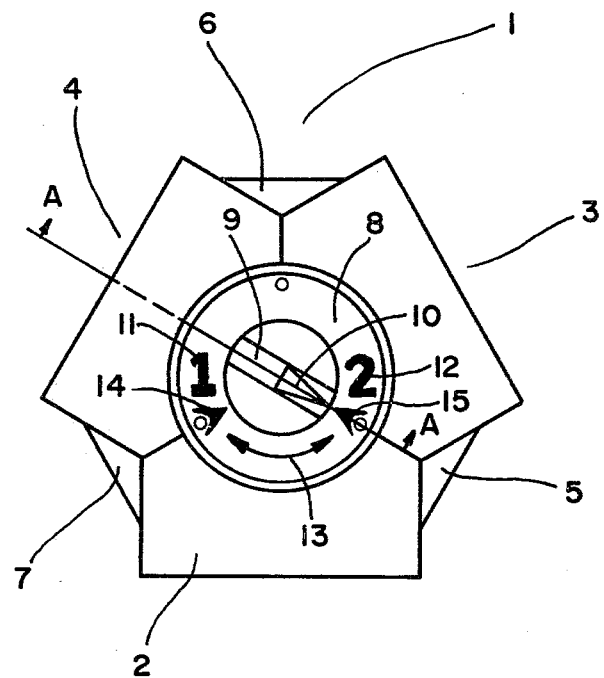
FIG. 1, is a top view of the assembled diverter valve.

The accompanying drawings and description illustrate a preferred embodiment of the invention but not for the purpose of limiting the same, in which the corresponding elements constituting the diverter valve are identified by the same reference numerals.

The present invention relates to an improved diverter valve of novel design, injection molded from PVC or ABS plastic, primarily intended and designed for use in septic sewage disposal systems, for alternately controlling the flow of effluent from a septic tank to a plurality of lines comprising a filter bed or drain field, such as described in U.S. Pat. No. 4,036,249. The present improved valve is so designed as to provide a sealed unit which may be used in septic disposal systems operating at normal pressures or pressures up to 25 psi.

Diverter valves, designed for underground installations must be rugged, of simple construction, and resistant to all types of deterioration in order to render trouble-free service to keep maintenance costs at a minimum. As previously noted, the valve described in the patent referred to above is particularly suited for such uses being cast from urethane, which involves a relatively expensive casting operation. PVC and ABS plastic are also rugged and extremely resistant to deterioration and products prepared therefrom may be injection molded. Applicants have designed a novel valve in which the units are prepared from PVC or ABS plastics by injection molding with considerable savings in the manufacturing process.

The improved valve described herein, as illustrated in FIG. 1, comprises a body section of injection molded PVC or ABS plastic in the shape of a "Y" designated generally by the numeral "1", includes a central section defining a circular chamber having an inlet "2", and a plurality of outlets, "3", and "4". The exterior shape of the valve body may be varied as desired and may be oval, round, or angular in shape.

Reinforcing ribs "5", "6", and "7", integrally cast with the valve body, may be used to reinforce the same and provide a more rugged construction.

A retainer cap, "8", more fully described hereinafter, serves to maintain an integral valve plug and stem "9", in operative position, the latter being mounted for partial rotation within the central valve chamber, the valve stem and cap being provided with suitable indicia, "10", "11", "12". "13", "14", and "15", to identify the position and direction of rotation of the valve plug and stem with reference to the inlet and the outlet ports of the valve body.

Figure 2:
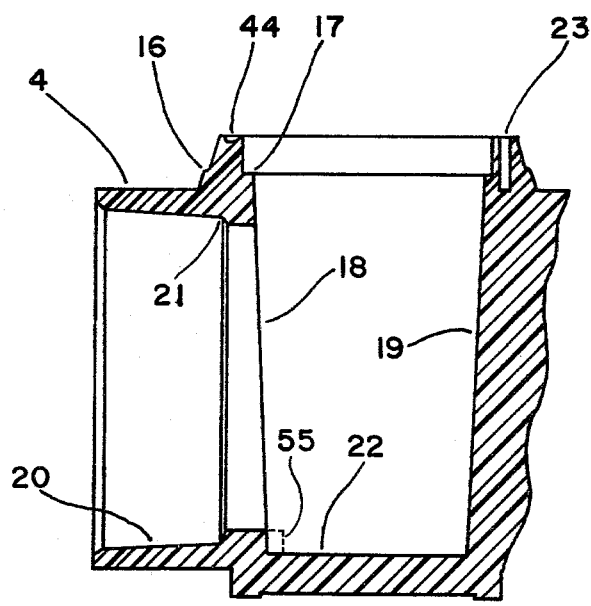
FIG. 2, is a partial vertical cross-section of the valve body, taken along the lines of A—A, of FIG. 1.

As shown in detail in the cross-sectional view in FIG. 2, the upper rim of the valve body is stepped, as at "16", to accomodate access pipes of different internal diameters. The upper internal wall of the valve body is provided with a recess "17", which in conjunction with the tapered walls "18", and "19", of the valve body or the bottom "22", serve as bearing surfaces to support the valve plug "24", in operative position.

The interior walls of the ports of the valve body are slightly tapered, as indicated at "20", to receive inlet and outlet connections and provided with an internal shoulder "21", adapted to engage and limit the extent to which said connections extend into the valve body. The inlet and the outlet ports are of standard construction. The upper surface of the valve body is provided with a series of drill holes, one of which is indicated at "23", to receive suitable fastening means, such as screws or bolts, to secure the retainer cap "8", for holding the integral valve plug and stem in operative position.

Figure 3:
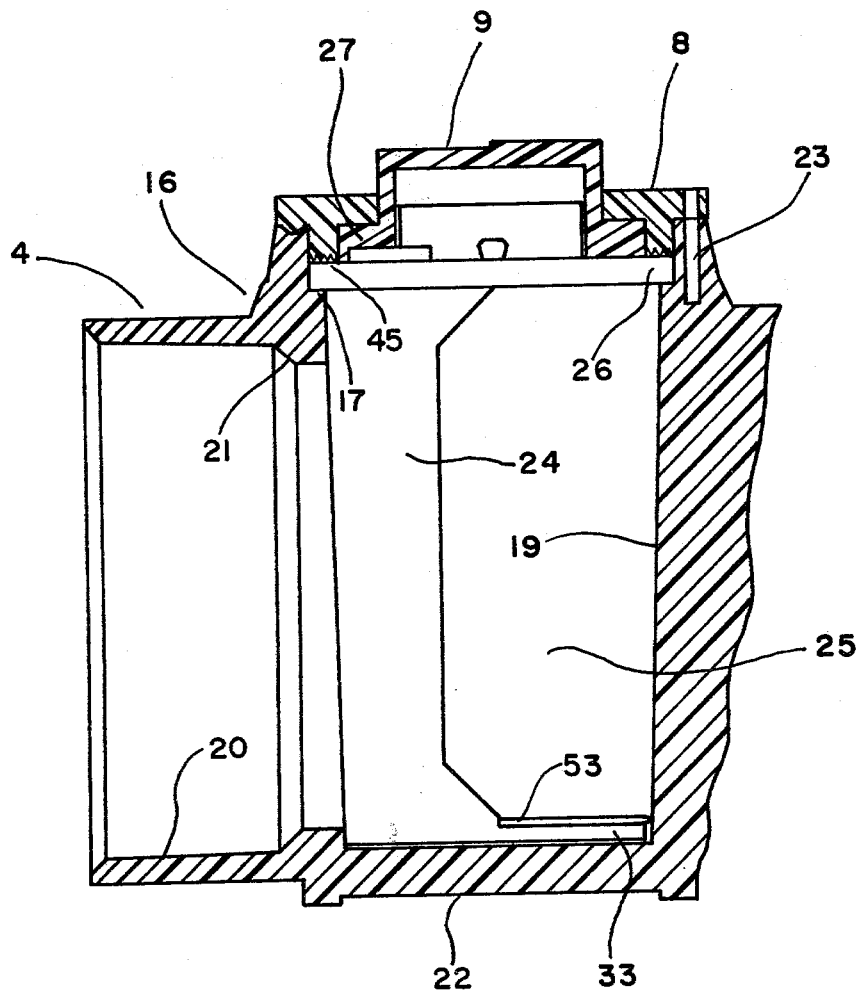
FIG. 3, is a view, similar to FIG. 2, partly in cross-section, showing the valve body and the retainer cap, together with the integral valve plug and stem.

FIG. 3, depicts the manner in which the valve plug and stem, designated generally by the numeral "24", is positioned within the central chamber. The valve plug has a center cut-away section "25", and a relatively narrow circular top section "26", serving as a bearing member and adapted to be seated within the recess "17", in the upper portion of the valve body.

Figure 4:
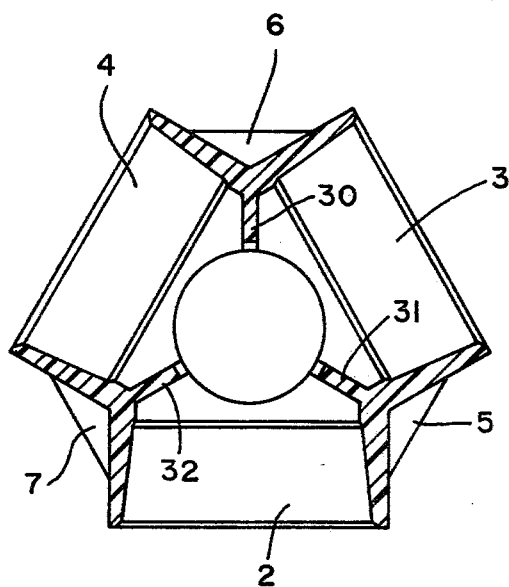
FIG. 4, is a horizontal cross-section of the valve body taken along the mid-section of the valve body.

FIG. 4, a horizontal cross-section, taken along the mid-section of the valve body, illustrates the special relationship between the inlet port "2", and the outlet ports, "3", and "4", and the central valve chamber, the latter being divided by the inwardly extending cast ribs, "30", "31", and "32", into three similar areas defining a cylindrical chamber adapted to receive the valve plug "24". The latter is so shaped that the inlet port "2", is always in direct communication with the central chamber, as is one of the outlet chambers, "3", or "4", depending upon the position of the valve plug. This enables the effluent to be directed into one or the other of the two legs of the drain field, while maintaining the other leg closed.

Figure 5:
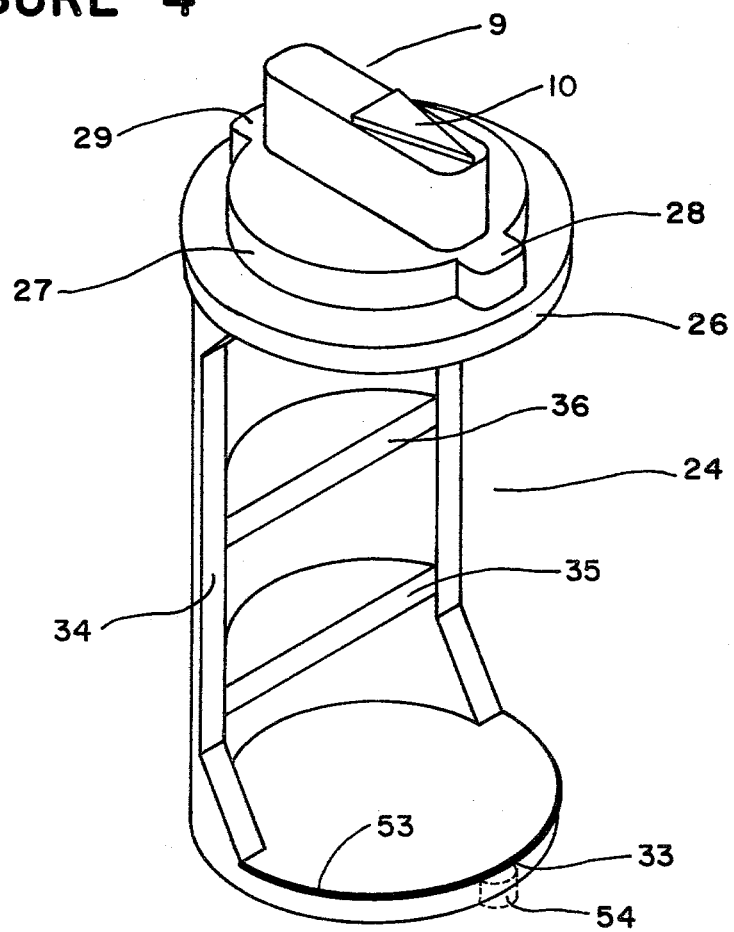
FIG. 5, is a perspective view of the integral valve plug and stem.

The integral valve stem and plug, identified generally by the numeral "24", is depicted in detail in FIGS. 5; 8, and 9, comprises a circular top "26", and a bottom section "33", serving as bearing surfaces, connected by a central partly cut-away section "34", having, if necessary, internal reinforcing ribs, "35", and "36". As previously referred to, there is attached to the circular top section "26", a raised ring "27", having oppositely disposed projections "28", and "29", which fit into grooves "38", and "39", in the retainer cap "8", the function and operation being specifically described in connection with FIG. 6, of the drawing.

The valve plug and the upper portion of the valve stem are preferably injection molded from a plastic other than that used in molding the valve body. Over a long period of use, contacting units molded from the same plastic have a tendency to adhere or fuse, rendering operation difficult. The valve plug and stem are therefore preferably molded from a plastic other than PVC or ABS. In order to avoid this difficulty, the valve plug and stem may be molded from an acetal homopolymer, a stable form of polymerized formaldehyde, sometimes referred to as "acetal resins", because of the repeating oxymethylene units ($-OCH_3-$), now readily available on the market under the tradename DELRIN. The characteristics of such polymers are set forth in some detail in the publication, *A Concise Guide to Plastics*, by Simons & Church, 2nd Edition, Copyright 1963. Published by Van Nostrand Reinhold Co., New York. See pages 8; 52, and 53.

Other dissimilar plastics which may be used in molding the valve plug and stem, include high density polyolefins, such as polyethylene and polypropylene.

Figure 9:
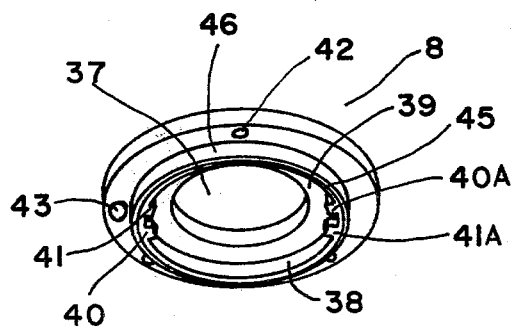
FIG. 9, also showing a portion of FIG. 7, is a perspective view, partly in section, of the upper portion of the valve stem.
Figure 9:
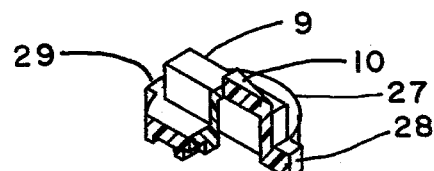
Figure 8:
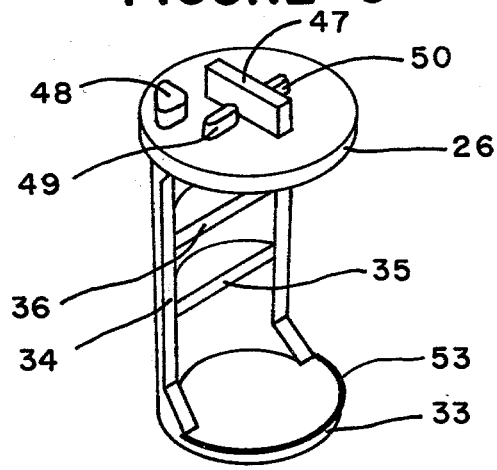
FIG. 8, depicting a portion of FIG. 7, is a perspective view of the valve plug before attachment of the upper section of the valve stem.

The use of these two different types of plastics eliminates any tendency of the solvent used during installation to seal the inlet and outlet pipes to the valve body, to accidently come in contact with and seal the valve plug to the valve walls. The valve plug and the upper portion of the valve stem, shown in FIGS. 8, and 9, are preferably molded in two sections, and the sections subsequently joined to form an integral valve plug and stem. In order to facilitate assembly, projections "47"; "48"; "49", and "50", are molded into the circular top "26", of the valve stem, and designed to fit into corresponding indentations in the lower surface of the cap "9", as shown in FIG. 9.

Figure 11:
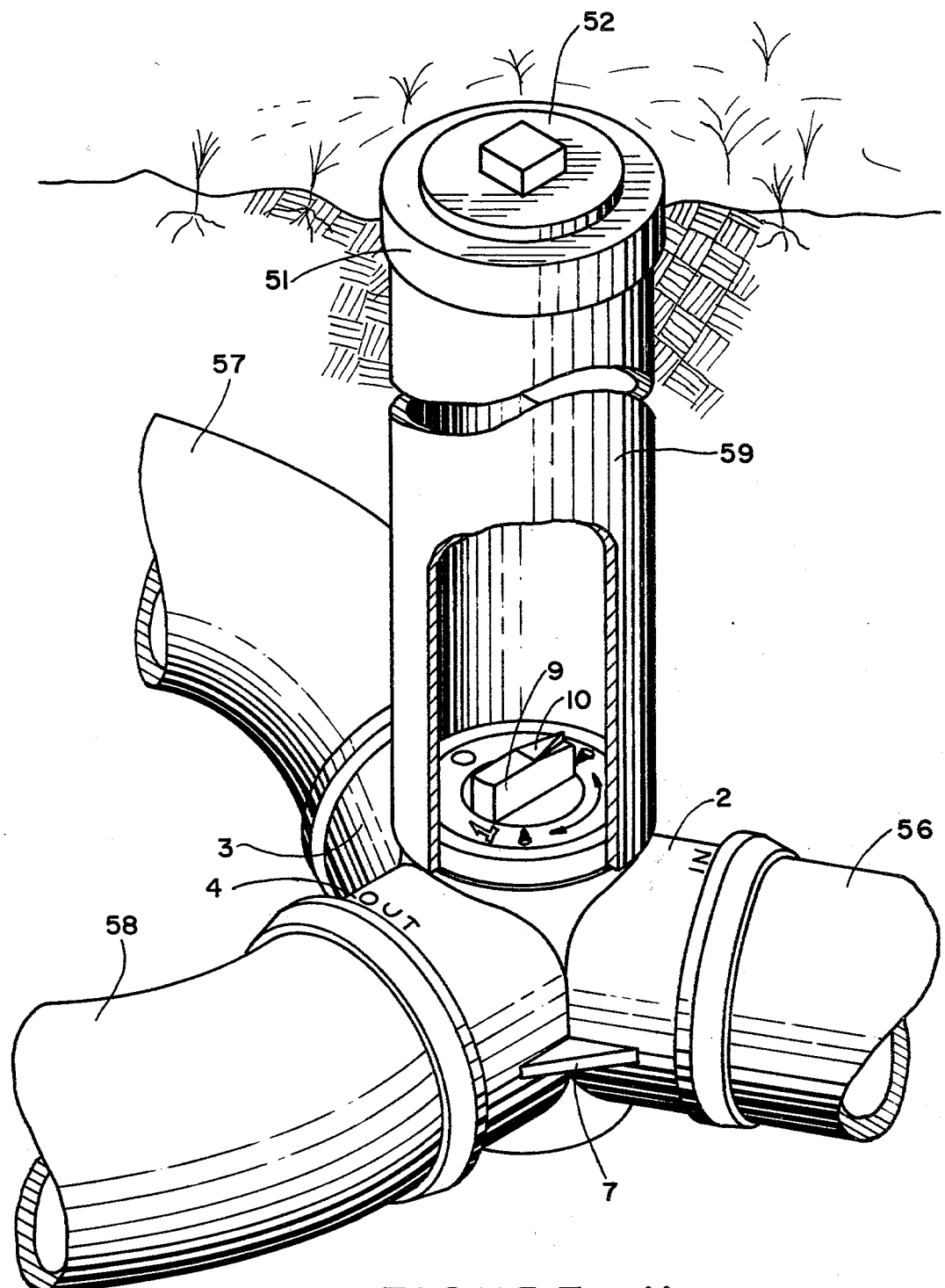

In order to provide a more secure connection between the top of the valve plug and the top portion of the valve stem or cap, a short rectangular projection "47", is molded into the circular top "26", of the valve plug, which fits into a corresponding rectangular depression in the under surface of the valve stem. The latter is shaped to receive an elongated slotted tool or "curb key", so that the valve may be conveniently operated through an access means, such as a pipe, from ground level, as illustrated in FIG. 11.

Figure 6:
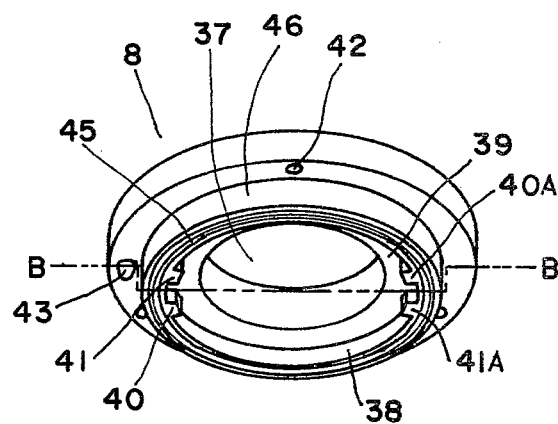
FIG. 6, is a perspective view of the molded cap for retaining the valve plug and stem in operative position.

The specific construction of the retainer cap "8", is depicted in FIG. 6. The circular cap has an opening "3", through which the valve plug and stem "9" projects, and oppositely disposed semi-circular grooves "38", and "39", forming stops "40", "40a", "41", and "41a", to partially limit the rotation of the valve plug and insure proper alignment of the inlet port "2", with one or the other of the outlet ports "3", or "4". The cap is drilled at a number of points, one of which is indicated by the numeral "42", to receive suitable fastening means to secure the cap "8", to the top of the valve body.

Figure 10:
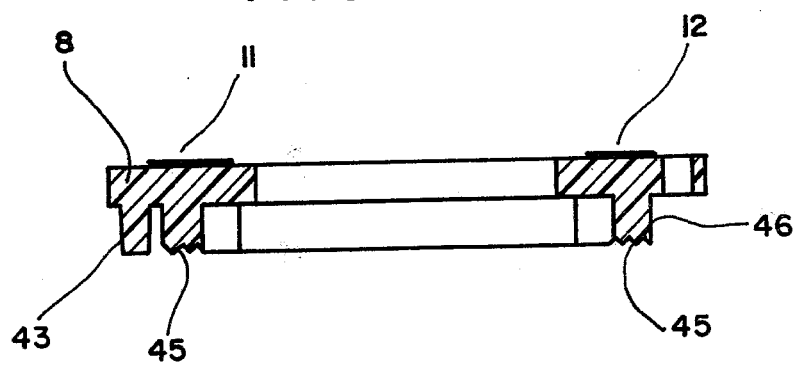
FIG. 10, is a cross-section of the molded retainer top cap, taken along the lines B—B, of FIG. 6, and FIG. 11, is a perspective view, partly in cross-section, showing the manner in which the diversion valve is installed in a septic system with an access pipe.

A cross-sectional view of the retainer cap "8", taken along the line B—B of FIG. 6, appears in FIG. 10. As shown in both FIGS. 6, and 10, the lower surface of the tapered ring "46", is provided with a series of serrations, "45", which are resilient and when under pressure, are slightly deformed, resulting in a liquid-tight seal with the upper surface of the valve plug. The cap "8", is also provided with a small projection "43", which engages a corresponding depression "44", as shown in FIG. 2, in the upper surface of the valve body to insure proper alignment of the two units when the valve is assembled.

In order to insure that the valve plug will not jam when moved to connect the inlet port "2", with either of the outlet ports, the valve plug is maintained in continuous resilient contact with the sealing surface of the valve body by means of a resilient projection "53", molded into the leading edge of the lower circular section "33", of the valve plug.

If desired, the valve plug may be fitted loosely within its bearing surfaces, in which case, as the valve plug approaches the end of its travel in either direction, a projection "54", shown in dotted lines in FIG. 5, on the leading edge of the circular bottom section "33", of the valve plug, engages one of two corresponding projections "55", one of which is depicted in dotted lines in FIG. 2. The latter projections are molded onto the lower internal surfaces of the valve body, oppositely disposed from the outlet ports "3", and "4", as shown in FIG. 2. Contact of the corresponding projection on the valve plug and of the projections on the walls of the valve body, forces or wedges the bearing surfaces of the valve plug into close contact with the opposing walls of the valve body to form a liquid-tight seal therewith.

Figure 7:
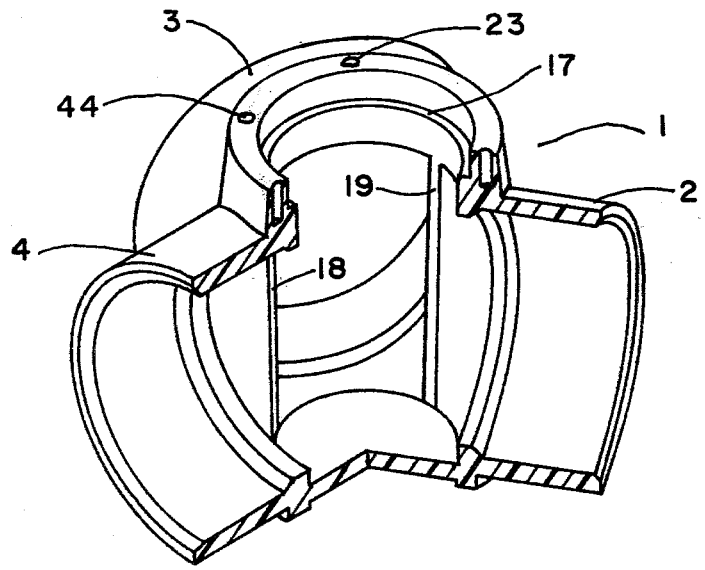
FIG. 7, is an exploded perspective view showing the manner in which the valve body, the integral valve plug and stem, and the retainer cap, are assembled to form the complete valve.

FIG. 7, represents, in perspective, an exploded view depicting the three basic components comprising the valve, namely, the valve body "1", the integral valve plug and stem, "9", and the retainer cap "8", all injection molded, and readily assembled to form the completed valve.

FIG. 11, represents a perspective view, partly in cross-section, illustrating a typical installation of the herein described valve in which the pipe "56", connects the inlet "2", of the valve with the outlet of a septic tank of conventional construction. Pipes "57", and "58", connect outlets "3", and "4", respectively, with the legs of a drain field, not shown.

Access to the valve is provided by suitable means, such as a pipe "59", having a cap "51", sealed with a threaded plug "52". The access means, such as a pipe, may be sealed to the upper part of the valve body to exclude surface water.

The same reference numerals are used to identify the various elements constituting the valve, in both the exploded view and the various other views depicting the three basic units, the function and operation of which have been described in detail above.

The invention has been described with reference to a preferred embodiment, but it will be understood that changes and variations, obvious to those skilled in the art, may be made within the scope of the appended claims.

Having thus described our invention, we claim:

1. A diverter valve adapted for use in septic systems operating under positive pressures, for controlling the flow of effluent from a septic tank to a plurality of leach beds, comprising:
   a thick-walled injection molded plastic valve body, closed at the bottom and having a vertically disposed central valve chamber, said valve body having a inlet port and a plurality of outlet ports,
   integrally formed ribs extending inwardly from the top to the bottom walls of the valve body, dividing the central chamber into separate inlet and outlet chambers communicating with the central valve chamber,
   a circular opening in the top of the valve body adapted to receive an injection molded tapered valve plug and stem, the latter having an upwardly extending projection adapted to receive a slotted tool to actuate the valve plug and stem from ground level, the walls of the valve body providing bearing surfaces for the valve plug,
   a valve plug having a cut-away central portion providing a passageway for alternately connecting the inlet port with one of the outlet ports while closing the other outlet ports, the valve plug having top and bottom circular sections mounted for partial rotative movement in sliding contact with the valve bearing surfaces in the top and side walls of the valve body,
   means for pressing the bearing surfaces of the valve plug into close contact with the valve body when the central cut-away portion of the valve plug is aligned with the inlet port and with an outlet port of the valve body, to form a relatively tight seal,
   a retainer cap for securing the valve plug and stem in operative position, said cap having a depending tapered ring portion contacting the top surface of the valve body and the upper circular portion of the valve plug to form a relatively tight seal, the upper external circular portion of the valve body adapted to accomodate access means of differing dimensions.

2. A diverter valve as defined in claim 1, in which the valve body is molded from a plastic selected from the group consisting of PVC and ABS plastic.

3. A diverter valve as defined in Claim 1, in which the plastic is PVC.

4. A diverter valve as defined in Claim 1, in which the plastic is ABS.

5. A diverter valve as defined in Claim 1, in which the upper external circular portion of the valve body is provided with a series of tapered steps to accomodate access means of differing dimensions.

6. A diverter valve as defined in claim 1, in which the lower surface of the depending tapered ring portion of the retainer cap is provided with a series of serrations, which upon the application of pressure, are slightly deformed to provide a liquid-tight seal.

7. A diverter valve as defined in claim 6, in which the serrations in the lower surface of the depending tapered ring consist of concentric grooves.

8. A diverter valve as defined in claim 1, in which the valve plug is so dimensioned as to leave a small amount of play between the bearing surfaces of the valve plug and the valve body, and elastic means for pressing the bearing surfaces of the valve plug into sealing contact with the valve body as the valve plug is rotated and the cut-away portion of the valve plug is aligned with the inlet port and an outlet of the valve body.

9. A diverter valve as defined in Claim 8, in which the elastic means is molded into the leading edge of the lower circular bearing surface of the valve plug.

10. A diverter valve as defined in claim 8, in which the elastic means is molded into the lower surface of the valve body.

11. A diverter valve as defined in claim 1, in which the valve body and integral valve plug and stem are molded from dissimilar plastics.

12. A diverter valve as defined in claim 1, in which the valve body is molded from PVC, and the integral valve plug and stem is molded from an acetal homopolymer.

13. A diverter valve as defined in claim 9, in which the elastic means molded into the leading edge of the circular lower bearing surface of the valve plug, contacts one of two corresponding projections molded into the lower surface of the valve body, oppositely disposed from the outlet ports of said valve body, so that as the valve plug approaches the end of its travel in either direction, the said valve plug will be pressed or wedged into sealing contact with the valve body.

* * * * *